United States Patent [19]

Knappstein et al.

[11] 4,145,195
[45] Mar. 20, 1979

[54] ADJUSTABLE DEVICE FOR REMOVING POLLUTANTS FROM GASES AND VAPORS EVOLVED DURING COKE QUENCHING OPERATIONS

[75] Inventors: Johannes Knappstein; Josef Stratmann; Manfred Strobel, all of Recklinghausen, Fed. Rep. of Germany

[73] Assignee: Firma Carl Still, Fed. Rep. of Germany

[21] Appl. No.: 784,372

[22] Filed: Apr. 4, 1977

Related U.S. Application Data

[63] Continuation-in-part of Ser. No. 700,337, Jun. 28, 1976, abandoned, which is a continuation of Ser. No. 557,811, Mar. 28, 1975, abandoned, which is a continuation of Ser. No. 269,723, Jul. 7, 1972, abandoned.

[51] Int. Cl.² .................................................. B01D 45/18
[52] U.S. Cl. ...................................... 55/242; 55/422; 55/436; 55/444; 202/227
[58] Field of Search ................ 55/242, 422, 436, 465, 55/442–444, 385 R, 496, DIG. 37; 202/227, 263

[56] References Cited

U.S. PATENT DOCUMENTS

| 342,099 | 5/1886 | Howe | 55/422 X |
|---|---|---|---|
| 871,194 | 11/1907 | Thomas | 55/221 X |
| 907,634 | 12/1908 | Narowetz | 55/440 X |
| 1,170,308 | 2/1916 | Mertz | 55/422 X |
| 1,632,813 | 6/1927 | Wittemeier | 55/444 X |
| 1,816,836 | 8/1931 | Gagen | 55/422 X |
| 1,895,618 | 1/1933 | Fedeler | 55/242 |
| 1,929,712 | 10/1933 | Pearce | 261/DIG. 9 X |
| 1,996,608 | 4/1935 | Beck | 55/422 X |
| 2,523,529 | 9/1950 | Zwickl | 55/442 X |
| 2,720,938 | 10/1955 | Cates | 55/444 |
| 2,802,543 | 8/1957 | Clark | 261/116 X |
| 2,878,892 | 3/1959 | Field | 55/242 X |
| 2,991,843 | 7/1961 | Bell, Jr. | 55/496 X |
| 2,992,814 | 7/1961 | Maher | 55/442 X |
| 3,086,342 | 4/1963 | Goettl | 55/422 |
| 3,606,897 | 9/1971 | Tobin et al. | 55/242 X |
| 3,656,280 | 4/1972 | Perry | 55/240 |
| 3,757,498 | 9/1973 | Hurlbut, Sr. et al. | 55/443 X |
| 3,775,950 | 12/1973 | Hallamore | 55/242 |

FOREIGN PATENT DOCUMENTS

| 777842 | 1/1972 | Belgium | 55/444 |
|---|---|---|---|
| 1941323 | 6/1966 | Fed. Rep. of Germany | 55/444 |
| 6913445 | 4/1969 | Fed. Rep. of Germany | 55/444 |
| 189184 | 11/1922 | United Kingdom | 55/444 |
| 246963 | 11/1969 | U.S.S.R. | 55/440 |

Primary Examiner—Frank W. Lutter
Assistant Examiner—Kathleen J. Prunner
Attorney, Agent, or Firm—McGlew and Tuttle

[57] ABSTRACT

The device is positioned in a stack arranged above a location where coke quenching is performed. The coke quenching, which takes place below the stack, evolves steam and gases containing solid coke particles or dust, and which must be prevented from passing into the outside atmosphere. The steam and gases flow upwardly through the stack and the device separates the solid coke particles and dust from the steam and gases. The device comprises a support beam carrying a plurality of shutter-like baffles, of plastic material, and liquid spray elements, and which is variable in length and positioned either obliquely or horizontally across the upper portion of the stack. In between successive coke quenching operations, the liquid spray elements are activated to flush the trapped solid coke particles and dust from the shutter-like baffles. The adjustable length of the device provides for the device to be positioned to extend across the stack at varying angles, or even horizontally. The device may be pivoted at either end of the stack so that it may be swung about the pivot to vary the angle of inclination of the device in the stack, and the adjustable length of the device accommodates the various oblique positions or the horizontal position. The support beam advantageously is supported by a diagonal brace extending from one wall of the stack to the support beam.

1 Claim, 16 Drawing Figures

ADJUSTABLE DEVICE FOR REMOVING POLLUTANTS FROM GASES AND VAPORS EVOLVED DURING COKE QUENCHING OPERATIONS

CROSS-REFERENCE TO RELATED APPLICATIONS

This application is a continuation-in-part of now abandoned application Ser. No. 700,337, filed June 28th, 1976, which, in turn, is a streamline continuation of application Ser. No. 557,811, filed on Mar. 28th, 1975, and now abandoned, and which, in turn, is a streamline continuation application of application Ser. No. 269,723, filed July 7, 1972, and now abandoned.

FIELD AND BACKGROUND OF THE INVENTION

This invention relates to devices for removing solid pollutants from steam and gases evolved during coke quenching operations and, more particularly, to a new and useful device, for this purpose, which may be adjustably positioned in a stack located above the site of a coke quenching operation for flow of the steam and gases therethrough, the device including baffle means for removing the solid pollutants from the steam and gases and spraying means, operable between successive coke quenching operations, to flush the trapped solid pollutants from the baffle means. Still more particularly, it is desired to emphasize that the present invention is not directed to a coke quenching tower, but rather to an improved means, positioned in a stack receiving steam and gases, evolved during a coke quenching operation below the stack, to remove solid pollutants, such as coke particles and dust, from the steam and gases before the latter are discharged from the stack to atmosphere, with the baffle structure of the device being flushed, by spraying means, between successive coke quenching operations.

At the present time, it is known to provide devices in the discharge stacks of coke quenching towers, for separating solid pollutants and water from the quenching vapors evolved in a coke quenching tower during coke quenching. The known devices include baffling to cause the steam and gases to move in a tortuous path for the purpose of removing solid pollutants from the steam and gases. Some of the baffle arrangements include a louver-like structure constituted by individual blades having noses or ribs located to deflect the gases in a desirable manner. In the known constructions, the ribs are formed on both an upper and a lower set of blades so that they extend uniformly toward the bottom-right or the bottom-left side of the stack, with the result that the quantity of pollutants separated thereby amounts approximately to 130 grams per ton of coke for an initial content, of the gases or steam, of about 400 grams per ton of coke.

It is important that a distinction be made between coke quenching towers and cooling towers or stacks for discharging the gases and steam evolved during quenching of incandescent coke in the quenching towers. Thus, in a coke quenching tower, the incandescent coke is sprayed with water to cool the coke and this spraying operation results in the evolution of steam and gases. The steam and gases leaving the coke quenching tower pass upwardly through a cooling tower or stack for discharge to atmosphere. It is in the cooling tower or stack, as distinguished from the coke quenching tower per se, that the devices are arranged for separating solid pollutants from the steam and gases moving upwardly through the cooling tower or stack for discharge to atmosphere. This pollutant separation operation is entirely distinct from the coke quenching operation, and the cooling tower or stack, and the baffle means or the like arranged therein, play no part in the actual quenching of the incandescent coke, which occurs in the quenching tower located below the discharge stack or cooling tower.

SUMMARY OF THE INVENTION

In accordance with the present invention, there is provided an improved structure which is adjustable in length and is adjustably positionable in the cooling tower or stack serving, for discharge to atmosphere, of the steam and gases evolved during a coke quenching operation in a coke quenching tower. The improved structure includes a louvered panel set for removing and trapping the solid pollutants from the gas and steam discharged to atmosphere through the cooling tower or stack, and also includes a spray arrangement operable, in between successive coke quenching operations, to flush the trapped solid pollutants, such as coke particles and dust, from the louvered panel set.

The present invention provides a means for removing, from the coke quenching vapors, a quantity of dust and other solid pollutants which is considerably higher than that possible heretofore, and which means may be adapted to a particular rate of discharge of the vapors from the device.

To this end, the invention provides an arrangement of a support structure which includes a baffle arrangement or structure of louvered panels, provided with upper and lower sets of panels or baffles having noses or offset ends which, in the upper set, are directed outwardly and, in the lower set are directed inwardly. The support structure further includes a conduit, which may be formed to a selected length, and which carries a plurality of spray nozzles along its length. In the interval between two successive coke quenching operations, this conduit is supplied with a spraying liquid, such as water, which flushes the trapped solid pollutants from the baffle arrangement or louvered panels arranged above the spray nozzles. The two blade sets or arrangements form a sort of double-louvered panel. Advantageously, the dust-catching louvered panels are mounted in the stack in the shape of a roof with the ridge in the axial plane of the stack.

The louvered panel may be constructed of wood, plastic, or similar material, and preferably a polypropylene or a material containing polypropylene may be used. The structure may be positioned adjustably to extend across the stack, or across a support in the stack, in the upper part of the stack, and the angle at which the structure extends across the stack may be set in accordance with the flow rate of the steam and gases being discharged from the quenching tower to flow upwardly through the stack. In order to change the angle at which the structure extends across the stack, it is necessary only to increase or decrease its length, as by adding or substracting sections, for example, and to shift a diagonal brace which supports the structure from a wall of the stack.

With a solid pollutant removing structure embodying the invention, the content of the solid pollutants, in the steam or gases evolved during quenching of the coke, may be reduced from 400 grams per ton of coke to 63 grams per ton of coke or from 250 grams per ton of coke to 47 grams, as indicated by tests which have been carried out according to the rules of the German Mining Authority. These results are attained when using baffle blades of polypropylene and having nose-ribs.

There is no definite explanation as to how this favorable effect is produced, but it is certain, especially when the baffles are constructed of polypropylene or the like, that an electrostatic charging of the blades and the formation of inhomogeneous electrical fields between the blades, takes place. The electrostatic charging of the blades is caused by the steam and gases evolved from the glowing coke in the first seconds of the quenching operation, and which contains the main quantity of the solid pollutants. While steam and gases are flowing upwardly through the stack from the quenching tower, the upwardly flowing stream charges the blades electrostatically by friction, and it can be assumed that, in the inhomogenous electrical fields, the unlike-charged dirt-particles are deposited on the blades and particularly in the included angle between the blades and their nose-ribs. In the subsequent phases of the coke quenching operation, moist vapors impinge on the blades and the electrical fields are broken down.

However, it is also possible that the unequal orientation of the nose ribs, in the different arrangements or sets of blades, produces favorable conditions for the dirt-deposit and for the condensation of water. Probably both effects act conjointly and increase each other.

The feature of the invention, involving the arrangement of the panel on a support beam which extends obliquely across the stack or cooling tower, permits a ready adaptation of the cleaning apparatus to the flow rate of the steam and gases upwardly through the stack. The support beam is supported on guide elements which are arranged adjacent the interior casing of the stack. They also may be supported from above, by longitudinal retaining ledges that are, in turn, secured by transverse connecting ledges and fixed to the longitudinal supporting structure by means of a clamping bolt.

To adjust the structure in accordance with the rate of flow of the gases, the structure may be either lengthened or shortened by merely adding or subtracting individual louver frames mounted on the support beam structure, and by correspondingly lengthening or shortening the feed lines for the spray nozzles, as by means for providing flexible interconnecting sections, for example. In one embodiment, this can be accomplished by adding or removing an entire louvered panel set, and then the inclination of the support beam is increased in order to accommodate an added louvered panel set. When a panel set is removed, the inclination of the support beam is decreased.

In one embodiment of the invention, the overall structure is supported in the discharge stack leading from a coke quenching tower by providing two vertically extending supports, which are opposite each other in the stack. The overall structure is then pivoted at one end to one of these vertically extending supports and anchored, at the other end, to the other vertically extending support, by a pin or bolt or the like. Either end may be pivoted to a vertically extending support, with the other end being anchored to a vertically extending support. In this modification, a diagonal brace extends, from that vertically extending support to which the overall structure is pivoted, to the overall structure. Flexible connections are provided in or to a feed line mounted on the support structure and provided with spray nozzles for flushing the louvered panels in between successive coke quenching operations, the supply of flushing liquid, such as water, being interrupted during a coke quenching operation. The effective area of the device, across the path of flow of the steam and gases, is a maximum at the largest inclination from the horizontal and is a minimum when the device is disposed to extend horizontally across the stack.

In a modified embodiment of the invention, the support structure comprises pairs of support beam sections arranged in spaced parallel relation for longitudinal movement relative to each other to increase and decrease the length of the support structure. Each beam section of a pair of carries a roller engaged with the other beam section of the same pair. One beam section of each pair is pivotally connected to a support extending vertically inside the stack, and the other beam section of each pair is connected to a roller movable in a vertical guide way opposite the vertical support and again arranged on the inner surface of the stack. A cable and winch arrangement is provided for pivoting the support structure to various angular positions, and the pairs of support beam sections automatically vary in effective length in accordance with the inclination of the device in the stack.

A series of individual louvered panels are supported on the two beam sections of each pair, and may be readily and easily removed therefrom or added thereto in accordance with the overall width or dimensions desired which, in turn, is dependent upon the angle of inclination. Spray pipes are supported by straps from the two support beam sections of each pair, and are supplied with flushing water through a feed line connected by tees to each of the spray pipes, the feed line including flexible conduit sections to accommodate the pivoting of the device within the stack.

In both embodiments of the invention, the individual louvered blades are inserted in slots in longitudinally extending, vertically oriented support plates supported either directly or indirectly on support bars which, in turn, are supported on the pairs of support beams. The support plates, as well as the individual blades, may be formed of a suitable plastic composition material such as, for example, polypropylene. Clamping means are provided to hold the panels, and particularly the individual blades, firmly engaged with the supports of each panel so that the blades or baffles are held stationarily in the support plates. As in the first mentioned embodiment, the flow area of the device may be increased or decreased, in accordance with its angular disposition in the stack, by adding or removing individual louvered panels. The individual louvered panels have a length which is only a minor fraction of the transverse dimension of the stack, so that a number of individual louvered panels are necessary in order to have the device extend completely across the flow area upwardly through the stack, the number depending, again, upon the angular orientation of the device in the stack, and which may vary, in either direction, from a horizontal orientation providing the smallest area of the solid pollutant trapping device, to a maximum angle of inclination providing a maximum area of the solid-pollutant removing device.

The apparatus or device of the invention may be erected in already existing stacks for coke quenching towers. In some instances, it may be desirable or necessary to widen the existing stack sections conically on one, two, or all sides in order to reduce draft losses to a minimum.

An object of the invention is to provide an improved device for separating solid pollutants from steam and gases evolved during coke quenching operations.

Another object of the invention is to provide such a device including a flushing system arranged to flush the solid pollutants trapped by the device, between successive coke quenching operations.

A further object of the invention is to provide such a device which is readily adjustable in length to vary its effective area, when mounted in a stack for discharge of steam and gases evolved during quenching of coke in a coke-quenching tower.

Yet another object of the invention is to provide such a device which may be disposed to extend across the stack at any desired angle varying from a horizontal orientation in either direction in order to vary the effective area of the device to correspond to various flow rates of the steam and gases upwardly through the stack.

A further object of the invention is to provide such an improved device which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENTS

Referring first to the embodiment of the invention shown in FIGS. 1, 2, and 3, and particularly to FIG. 3, the device embodying the invention, and operable to separate solid pollutants from steam and gas evolved during a coke quenching operation, is illustrated as mounted in the stack leading from a coke quenching tower and serving to discharge the steam and gas evolved during the coke quenching operation, the coke quenching tower being disposed below the stack and not being shown in the drawings. In the particular embodiment shown, the discharge stack includes a casing support structure 15 and an upright casing 16. Casing 16 is provided with a device supporting structure for the solid pollutants separating device of the invention, and this supporting structure is in the form of vertically extending support beams 14, 14 engaging inner surfaces of the casing 16.

The device includes two or more main support beams 13, having opposite ends 24 and 26. In the solid line position shown in FIG. 3, the support beams 13 are pivoted or otherwise connected at their ends 26 to locations along the right-hand vertical beam or column 14, and they are anchored, by a pin or the like, to locations along the left-hand vertical beam or column 14. The device thus may be pivoted, about a pivot or pin 26a, between the position indicated in solid lines and the several positions 13', 13" and 13''' indicated by dotted lines, with the lengths of the beams 13 being suitably selected in accordance with the particular angular orientation of the device. The position 13', in which the support beams 13 extend horizontally, is the minimum width position, whereas the positions 13" and 13''' indicate inclination angles respectively less than and more than the inclination of the beams 13 in the solid line position.

Alternatively, the support beams 13 may be pivotally connected at their ends 24 to locations along the left-hand vertical beam or column 14 and connected by a pin or the like at their ends 26 to locations along the right-hand vertical beam or column 14. In this arrangement, the device may be pivoted about pivots 24a at the ends 24 of the support beams 13, from the position shown in solid lines to the positions indicated, for example, at 13b and 13b'. The effective widths or areas of the device, for trapping solid pollutants in the steam and gases flowing upwardly through the casing 16, increase with the degree of inclination from the horizontal. Thus, one of the intermediate positions, namely the position 13 shown in solid lines, provides a flow area for the gases or steam therethrough which is slightly less than the maximum position indicated at 13'''.

In accordance with the invention, the support beams 13 support a plurality of louvered panels 9, 9', 9" and 9''', as well as a spray pipe 11 having discharge orifices 12 directed toward the louvered panels. While four louvered panels are shown in FIG. 3, the number may be more or less in dependence on the inclination of the device to the horizontal. The spray nozzles 12 are arranged at regular intervals, and the pipe 11 may comprise several sections interconnected by flexible conduits to accommodate adjustments in the angle of inclination of the device. The upwardly flowing steam or gases pass through the louvered panels, described more fully hereinafter, and the sprays from the nozzles 12, which are preferably fine steel nozzles in a plastic spray pipe 11, are directed upwardly toward the baffles or vanes of the louvered panels.

Figures 1, 2:
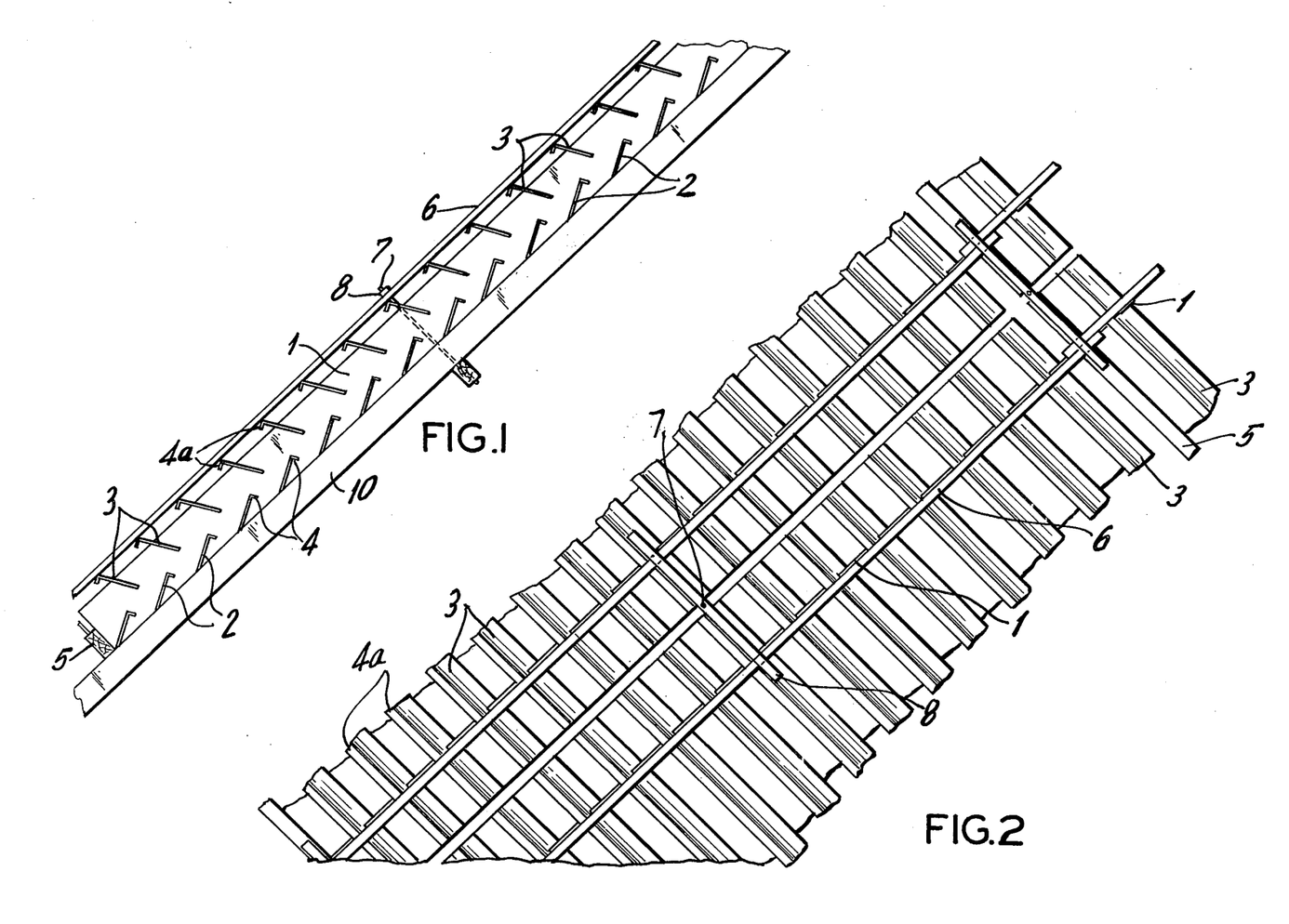
FIG. 1 is a partial side elevational view of a louvered panel forming part of a device for separating solid pollutants from steam and gases evolved during a coke quenching operation, in accordance with one embodiment of the invention.
FIG. 2 is a partial top plan view of the device shown in FIG. 1.

As best seen in FIGS. 1 and 2, each louvered panel comprises a plurality of lower shutter blades, vanes, or baffles 2, and a set of upper blades, vanes, or baffles 3. The shutter blades or baffles are supported in slots in a vertically oriented elongated baffle support plate 1 which is positioned on beam 10 by means of spacer elements 5, and the plate 1 with the shutter blades or baffles mounted therein is retained in position by bolts 7 connecting transverse ledges 8 to beam 10, and more particularly to spacers 18 extending transversely of beam 10. The transversely extending ledges 8 hold in position longitudinally extending ledges 6 which engage the upper set of blades or baffles 3.

Baffles 2 and 3 have noses, ribs, or flanges 4 and 4a, respectively, and these flanges or ribs extend in respective opposite directions in order to provide impinging areas for aiding in the removal of solid pollutants from the steam or gases flowing upwardly through the device.

The steam or gases, carrying the solid pollutants, pass between adjacent lower baffles 2 and upper baffles 3, so that the stream of the steam or gases is deflected to flow in a turbulent manner and impinges upon the baffles, particularly at the location of the noses or flanges 4 and 4a. Consequently, and due to the turbulent flow and such impingement, the solid pollutants are separated from the upwardly flowing stream of steam or gases and collect largely at the locations of the flanges or noses 4 and 4a.

The pollutants thus trapped on the baffles during a coke quenching operation taking place in a coke quenching tower below the stack or tower containing the baffle device of the present invention, are flushed from the baffles 2 and 3 in between successive coke quenching operations. This flushing is effected by connecting the discharge pipe 11 to a source of liquid, such as water, under pressure for discharge of the fluid through the nozzles 12 which are directed against the baffles 2 and 3. Following such quenching, the baffles 2 and 3 which have been cleaned of pollutants by the flushing operation, are now ready to trap pollutants evolved in a subsequent coke quenching operation.

Figure 3:
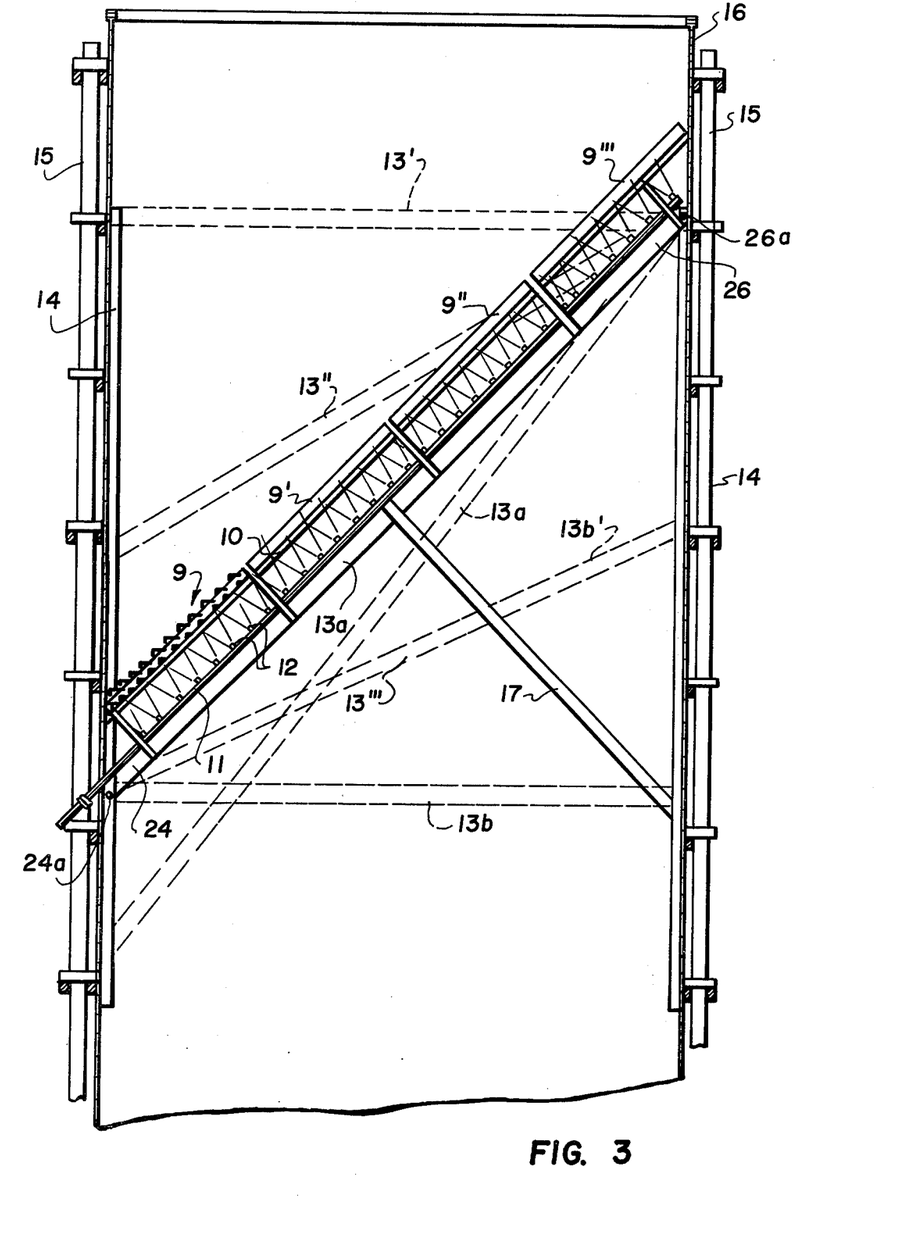
FIG. 3 is a partial sectional view through a stack for discharging steam and gases evolved during a coke quenching operation in a coke quenching tower, and illustrating the device of FIG. 1 as mounted in a stack and adjustable to various inclinations.

The device shown in FIGS. 1, 2 and 3, which is adjustably positioned in the casing 16, is preferably reinforced by a diagonal brace 17 extending from one support member 14 upwardly to a central connection on the supporting means or support beam 13. When it is desired to change the inclination of the device, it is necessary only to either elongate the device or to shorten the device by, in the one case adding and in the other case removing, panels or panel sections such as shown at 9', 9'' and 9'''. Each panel section includes not only the baffles 2 and 3 but also an associated spray conduit and nozzle section associated with each panel section. The spray conduit and nozzle sections are releasably coupled to each other, and flexible connections may be provided where necessary.

In the arrangement shown in FIG. 3, the upper end 26 of the support beam 13 preferably is anchored on the right hand support structure 14, as by a pivot or the like 26a, and the length change is effected by adding or removing the lower panel section 9 to facilitate pivoting the whole structure to any one of the dotted-line positions indicated at 13', 13'' or 13''' for example. The change in length is similarly effected when the support beams 13 are pivoted at 24a to the left hand support structure 14, the inclination in this case being reversed from that shown in FIG. 3.

Figure 14:
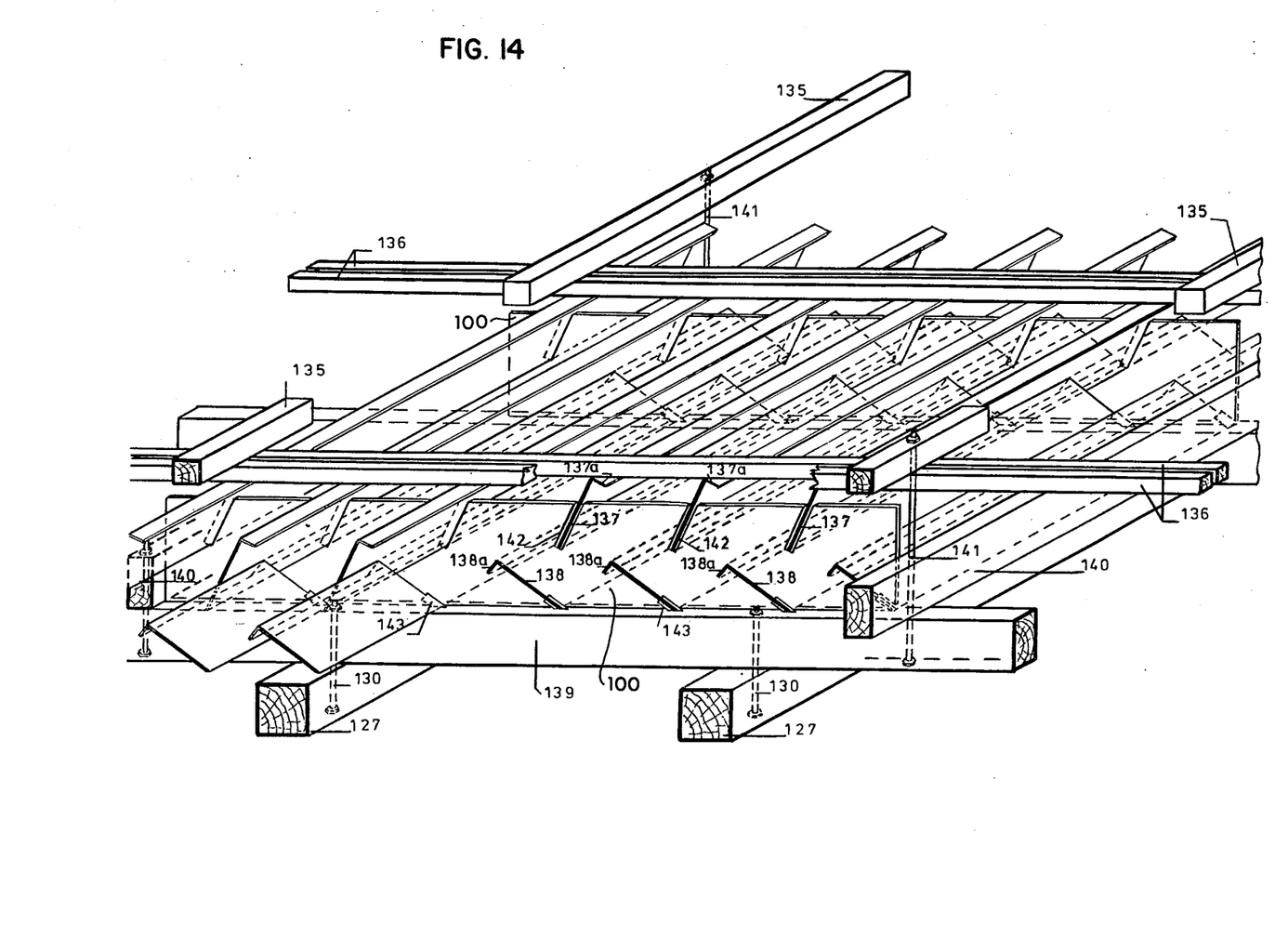
FIGS. 14, 15 and 16 are partial perspective views, partly in section, illustrating details of the louvered panels.
Figure 15:
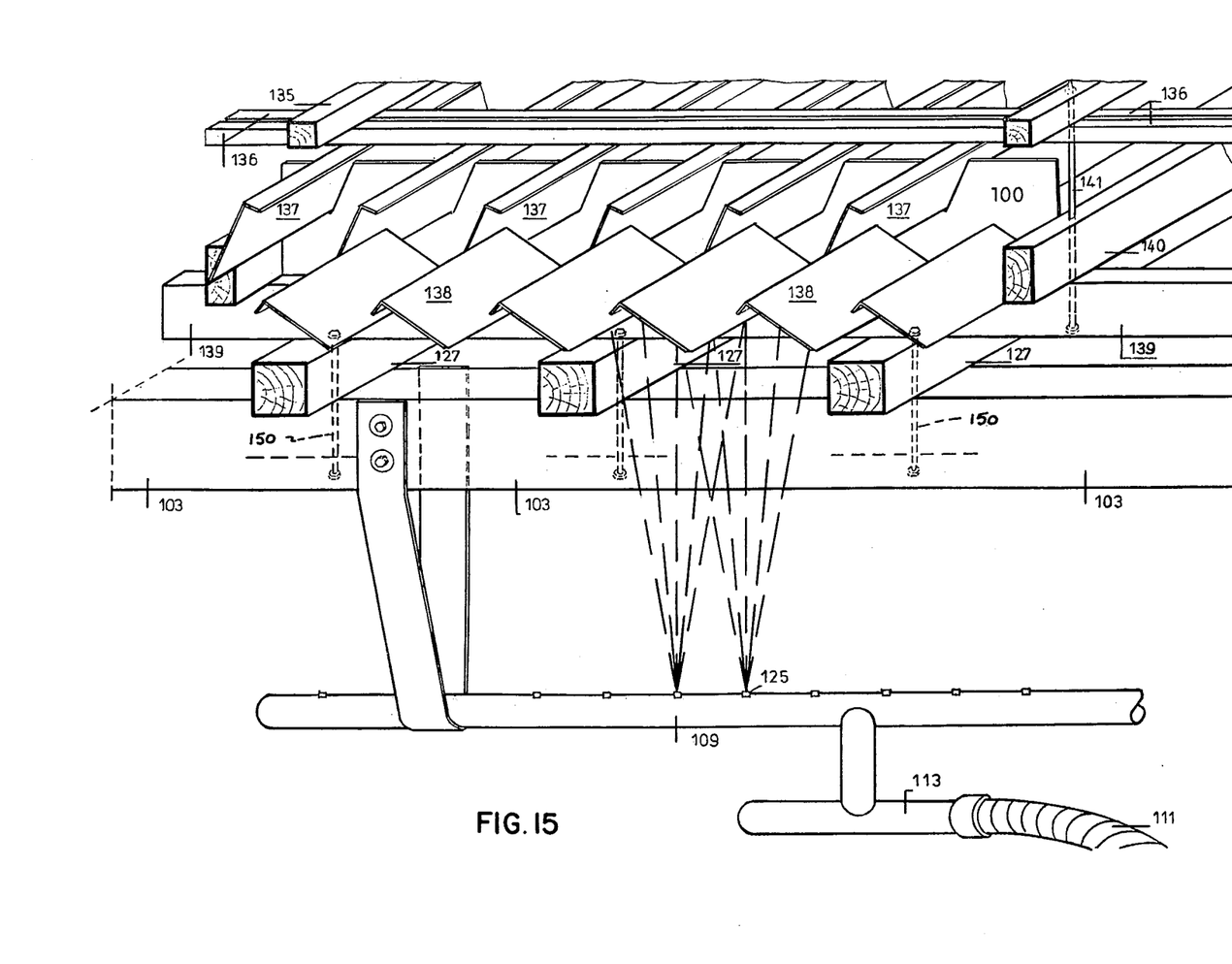
Figure 16:
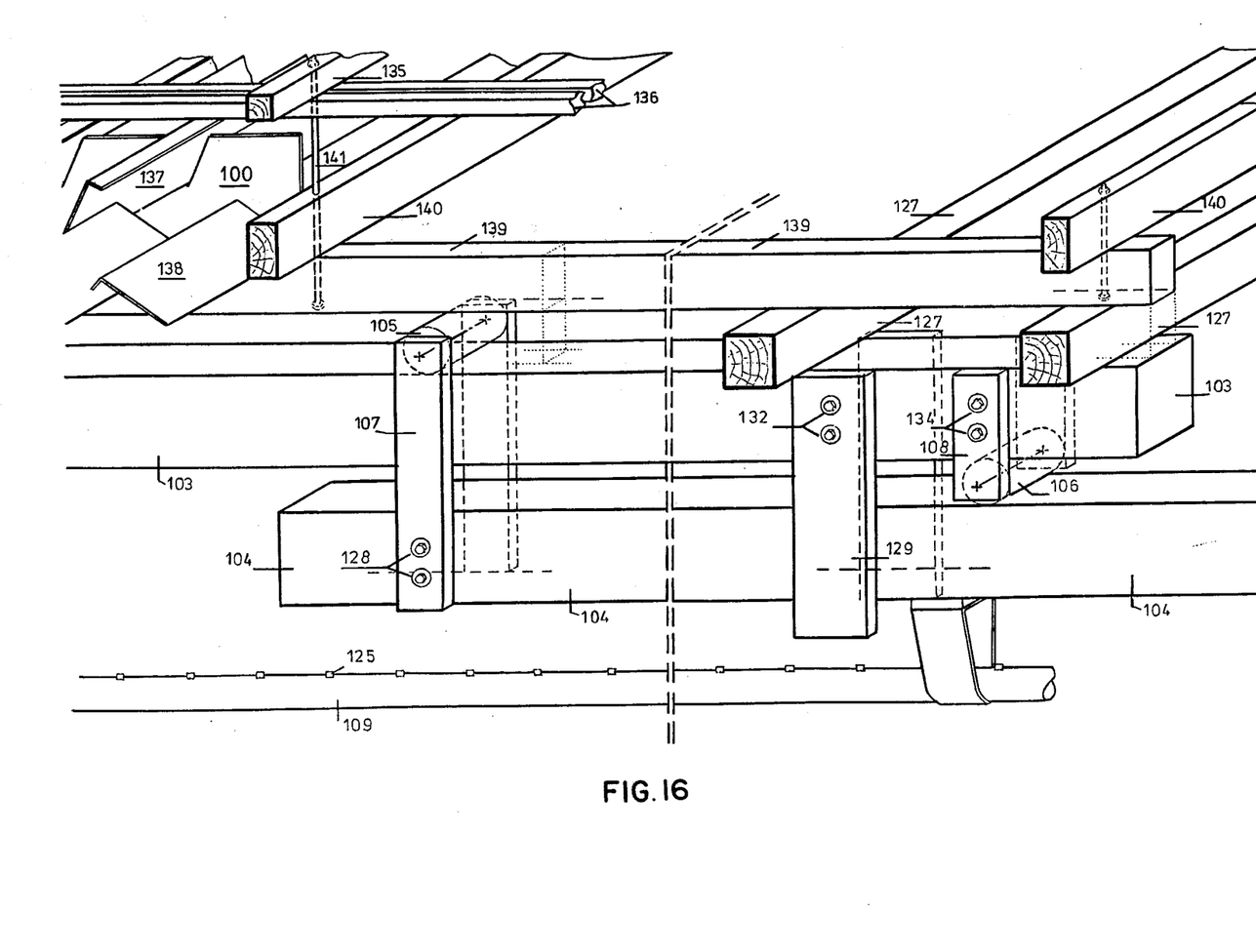

FIGS. 4 through 16 illustrate a further embodiment of the invention corresponding, in principle, to the embodiment shown in FIGS. 1, 2 and 3. More particularly, FIGS. 14, 15 and 16 show, in greater detail, the baffle structure shown in FIGS. 1, 2 and 3, which baffle structure is the same as that shown in FIGS. 4 through 13.

Figure 4:
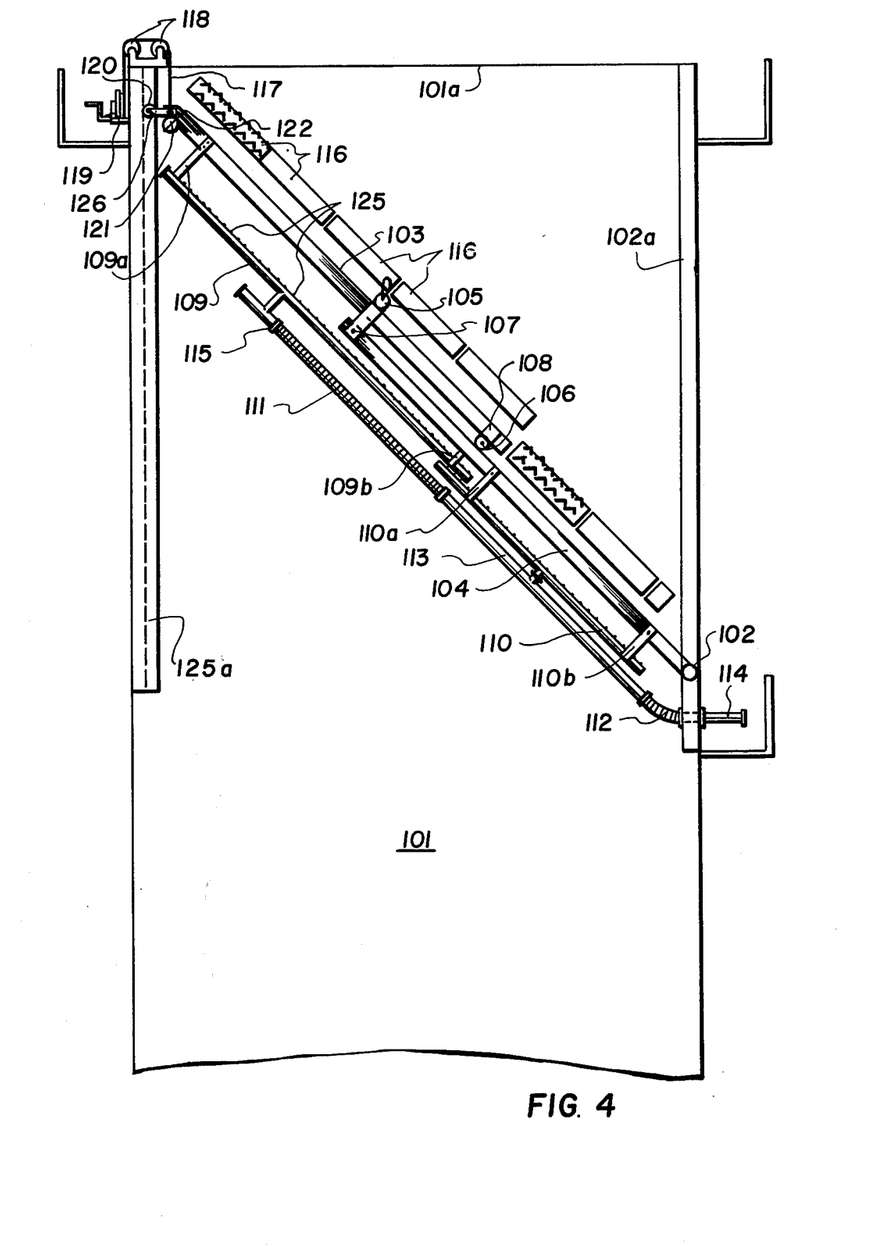
FIG. 4 is a view similar to FIG. 3 illustrating another embodiment of the invention.

Referring to FIG. 4, a discharge stack 101 is arranged to receive the stream of steam and gases, including pollutants, flowing upwardly from a coke quenching tower located below the stack 101 and not shown, stack 101 having a discharge mouth 101a at its upper end. The device for trapping the pollutants from the fumes arising from a coke quenching operation is mounted in stack 101 below discharge mouth 101a. The illustrated device comprises supporting beams 103 and 104, of which supporting beam 104, is pivoted, by means of a pivot 102, to a vertical support 102a secured to the inner surface of the wall of stack 101. Supporting beam 103 carries, at its outer end, a roller 120 mounted on a shaft 126 supported on brackets 123 secured to beam 103 by bolts 133, as more particularly shown in FIGS. 5 and 6.

Figure 6:
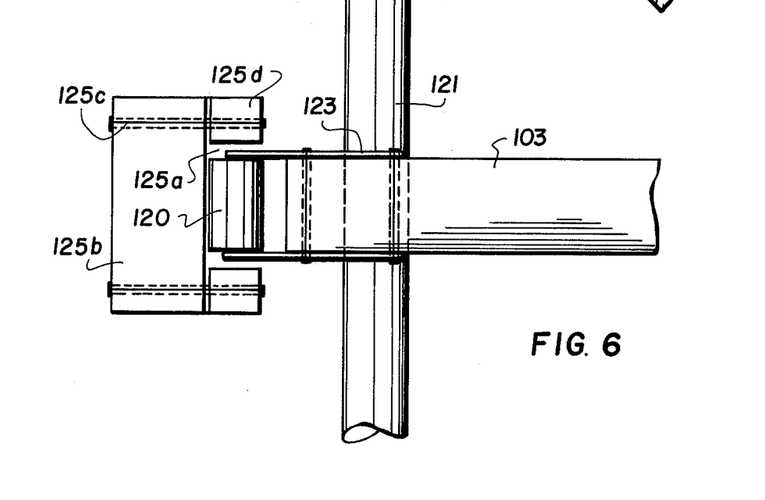
FIG. 6 is a sectional view taken on the line VI—VI of FIG. 5.
Figure 7:
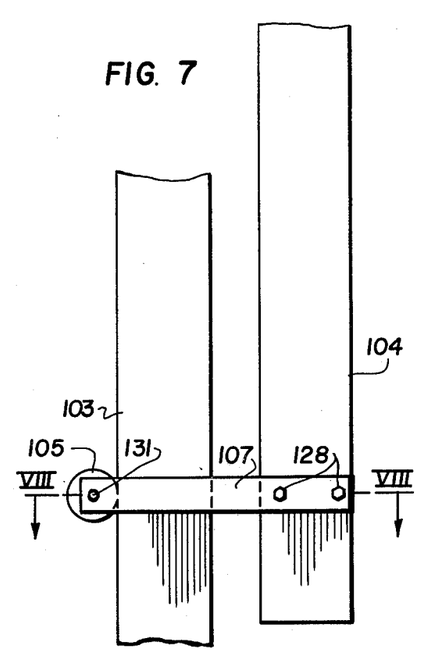
FIG. 7 is an enlarged partial side elevation view illustrating one interconnection between the support beams of a pair.
Figure 8:
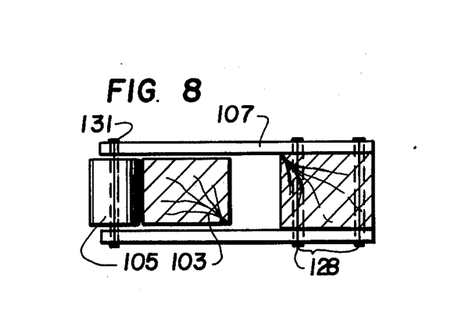
FIG. 8 is a sectional view taken on the line VIII—VIII of FIG. 7.
Figure 9:
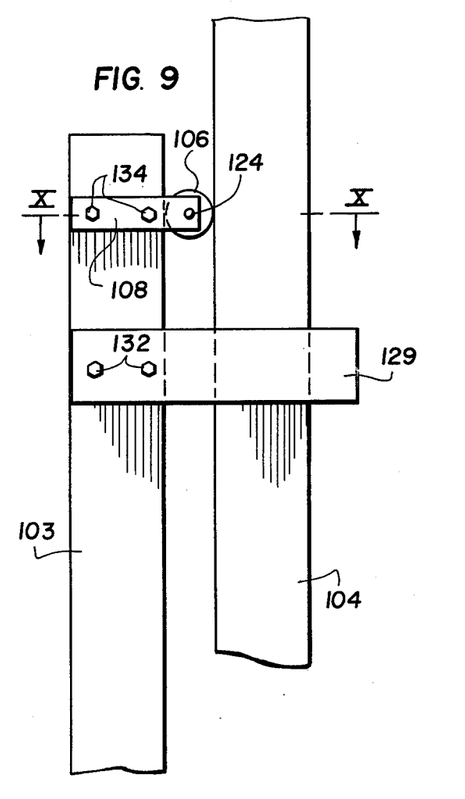
FIG. 9 is a view similar to FIG. 7 illustrating the other interconnection of the two support beams of a pair.
Figure 10:
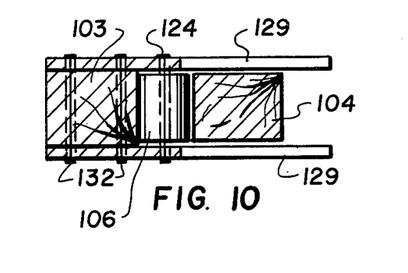
FIG. 10 is a sectional view taken on the line X—X of FIG. 9.

Roller 120 is adapted to run up and down in a guideway 125a formed, as best seen in FIG. 6, by a rectangular beam 125b and lateral strips 125d secured to beam 125b by bolts 125c. Guideway 125a is fixed to that wall of stack 101 opposite the wall to which the support 102a is fixed. Of course, multiple supports 102a and multiple guideways 125a may be provided depending on the width of the device and, consequently, the number of supporting beams 103 and 104. However, for the sake of simplicity in the description, the description will refer only to single elements 102a and 125a.

Figure 5:
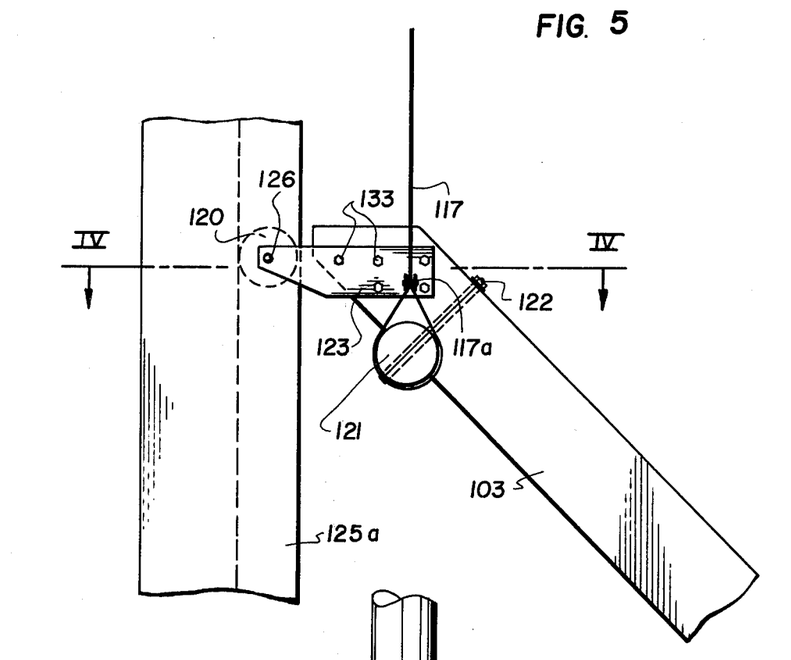
FIG. 5 is a partial elevational view, to an enlarged scale, of the upper left-hand portion of the device shown in FIG. 4.

Lifting and lowering of supporting beam 103, with pivoting of support beam 104 about pivot 102, is effected by a traction rope 117 attached to a supporting bar 121 by means of a clamp 117a. In turn, and as best seen in FIG. 5, supporting bar 121 is secured to each supporting beam 103 by bolts 122. Traction rope 117 is trained over pulleys 118 and secured to a manually actuable hoist means, such as a winch 119 which is mounted in a suitable bracket out on the exterior of stack 101. As should be clear from FIG. 4, while support 102a is mounted on the right side of stack 101 and guideway 125a is mounted on the left side, the positions of these elements may be reversed with winch 119 being mounted in the support shown in the right hand side of the stack.

Supporting beams, or beam sections, 103 and 104 may be telescoped to change the overall width of the device in accordance with its angle of inclination. For this purpose, and as best seen in FIGS. 5 through 16, supporting beams 103 and 104 are interconnected, for relative longitudinal displacement, by rolles 105 mounted on a shaft 131 supported by means of fork strips 107 and rollers 106 mounted on a shaft 124 supported by means of fork strips 108. Rollers 105 engage supporting beam 103, and the fork strips 107 embrace supporting beam 103 and are connected to supporting beam 104 by bolts 128. Rollers 106 engage supporting beam 103 and fork strips 108 are connected to supporting beam 104 by means of bolts 134. Rollers 105 and 106 are so disposed that beams 103 and 104 can be shifted parallel too each other and without sagging under their own weight. To prevent relative lateral displacement of supporting beams 103 and 104, guide pieces 129 are secured to supporting beam 104 by bolts 132 and extend on opposite sides of supporting beam 103.

Figures 11, 12:
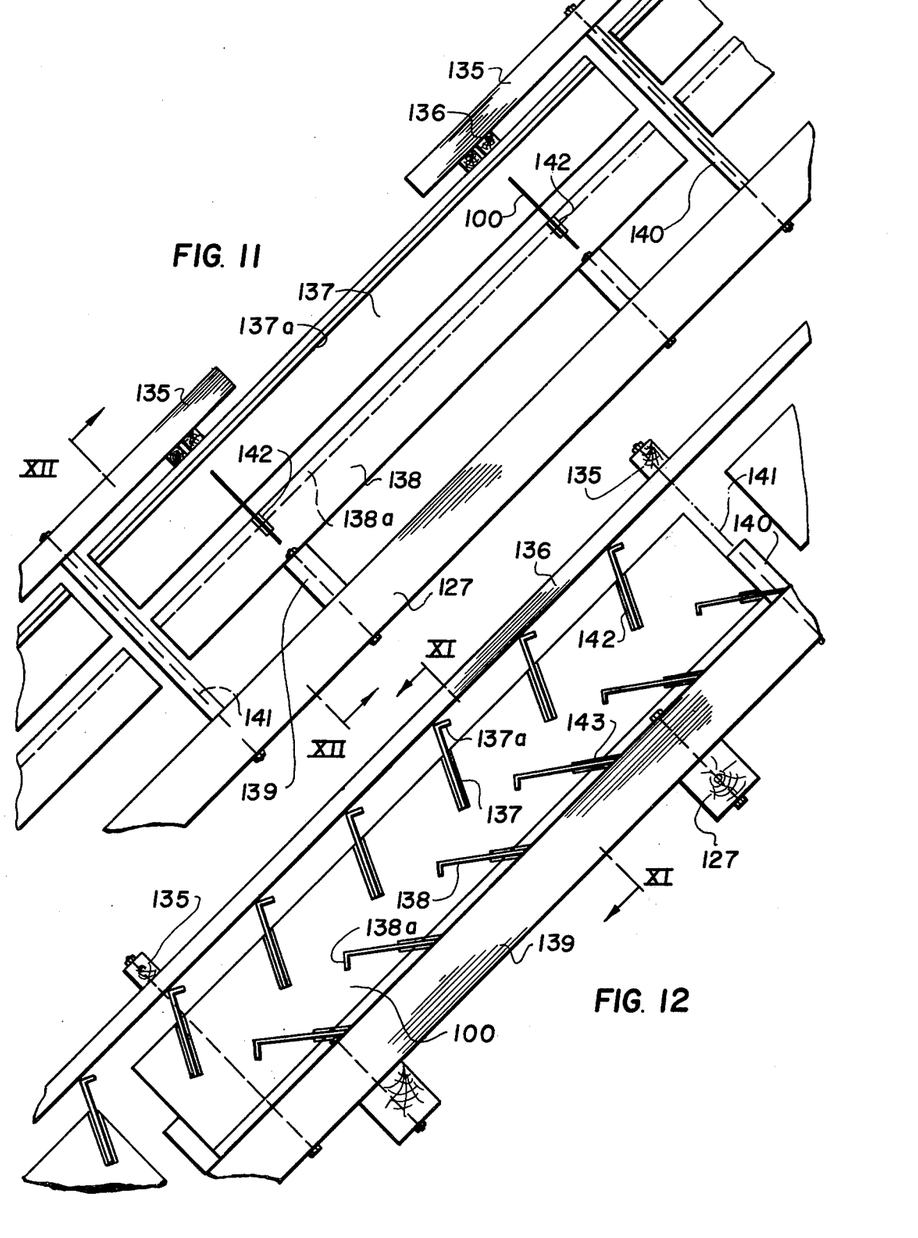
FIG. 11 is a view, partly in section, taken on the line XI—XI of FIG. 12 and illustrating, to a larger scale, the construction of a louvered panel.
FIG. 12 is an elevation view, partly in section, taken on the lines XII—XII of FIG. 11.

Panel sections 116 for accommodating the baffle structures for trapping pollutants during quenching of coke rest on supporting beams 103, 104. These panel sections are shown in FIGS. 11 and 12 in longitudinal sectional views which are taken perpendicularly to each other and to a larger scale than that used in FIG. 4. Each panel section comprises supporting bars 139 and cross bars 127 connected to each other by means of threaded bolts 130. As the coke quenching fumes pass upwardly through stack 101, they exert a pressure on the panel sections containing the baffles. In order to prevent lifting of the panel sections from supporting beams 103 and 104, the panel sections are retained by means of clamping strips 135 secured to supporting bars 139 and cross bars 127 by means of bolts 141. Spacers 136 are provided to assure that the function of the baffles is not affected unfavorably by the clamping strips 135.

Spacers 140 are supported in supporting bars 139 by bolts 141, and baffle supporting plates 100 engage spacers 140. Baffle supporting plates 100 are formed with slots 142 and 143, at respective opposite edges thereof, and baffle blades 137 and 138, made of polypropylene are received in these slots. These baffles, at their free edges, are formed with flanges or rib portions 137a and 138a projecting from the baffle at substantially a right angle. The baffle blades serve to entrap the coke dust and other solid pollutants carried upwardly by the fumes from the coke quenching operation.

Crossbars 127 rest on the supporting beams 103 and 104, and are of dimensions providing suitable clearance for the rollers 105 and 106. The crossbars 127 may be secured to supporting members 103 and 104 by suitable bolts 150 as best seen in FIG. 15.

During a coke quenching operation, the solid pollutants rising upwardly with the fumes from the coke quenching operation are trapped by the baffles 137 and 138 in the same manner as described in connection with the baffles 2 and 3 of the embodiment shown in FIGS. 1, 2 and 3. Between successive coke quenching operations, baffle blades 137 and 138 are flushed in order to remove the deposited solid pollutants, such a coke dust, from the blades 137 and 138. For this purpose, and as shown more particularly in FIGS. 4, 13, 15 and 16, respective spray pipes 109 and 110 are supported on beams 103 and 104, and are formed with spray openings 125, or provided with nozzles 125, directed toward baffle blades 137 an 138. The spray pipes are secured to the respective beams 103 and 104 by means of respective holders 109a, 109b and 110a, 110b. Flushing water is supplied to spray pipe 109 through a feed pipe 113 connected, in turn, to a flexible connecting tube 112 and a water system connection 114. Flexible connecting tube 112 permits an easy pivoting of the water spray system following the inclination of supporting beams 103 and 104. Water is supplied to spray pipes 109 and 110 through tees 115 connected thereto and to feed pipe 113 or flexible pipe 11.

Figure 13:
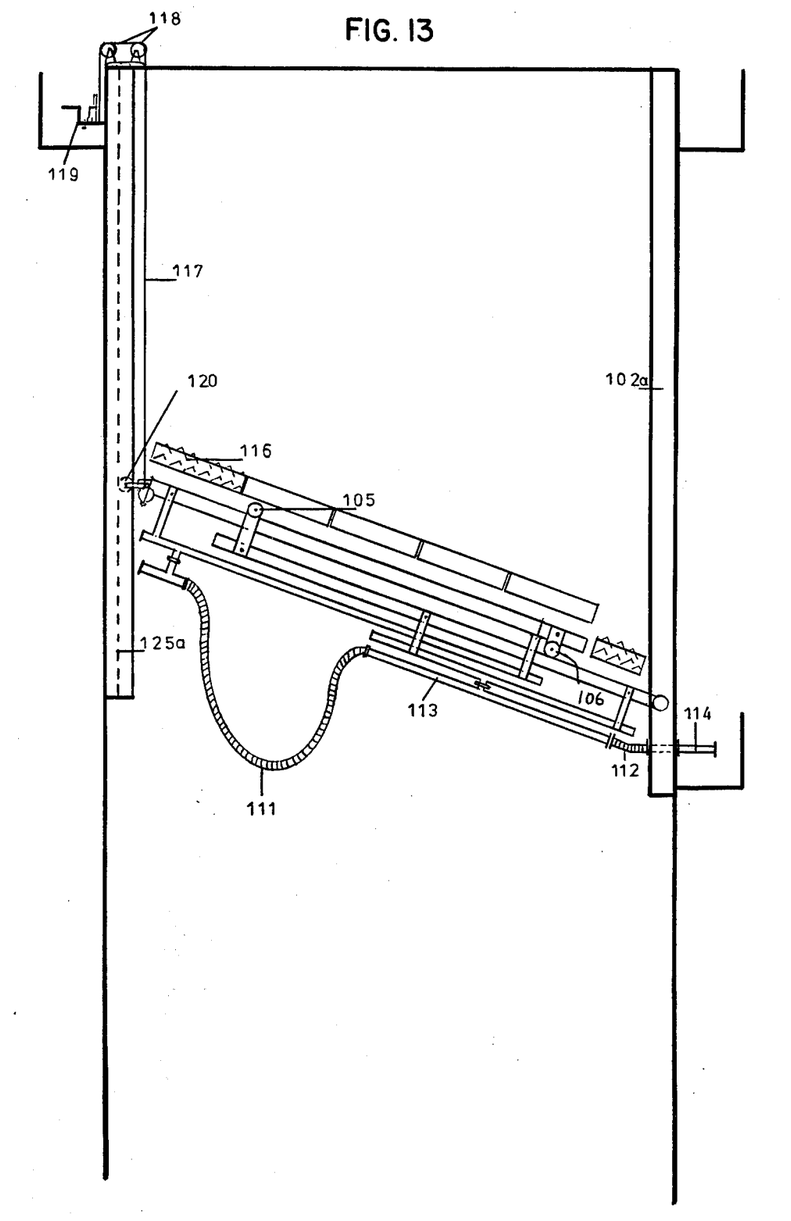
FIG. 13 is a view, similar to FIG. 4, illustrating the device of FIG. 4 in another angular orientation in the stack.

FIG. 13 illustrates how flexible pipe 111 follows the telescoping of the supporting structure as the angle of inclination of the structure is changed by lowering or raising supporting beam 103 telescoped to supporting beam 104.

It should be noted that the details of the mounting of the baffles, and the associated panels, as shown in FIGS. 11, 12, 14, 15 and 16 are correspondingly used for the mounting of the baffles shown in FIGS. 1, 2 and 3.

At the risk of repetition, it should again be emphasized that, during a coke quenching operation, no water is supplied to the spray pipes, and the baffles trap solid pollutants, such as coke dust, rising, with the fumes from the coke quenching operation, to the stack 101 which is disposed above in communication with a coke quenching tower. It is only inbetween successive coke quenching operations that water is supplied to the spray pipes solely to flush the solid pollutants from the baffles, and not for the purpose of quenching coke.

While specific embodiments of the invention have been shown and described in detail to illustrate the application of the principles of the invention, it will be understood that the invention may be embodied otherwise without departing from these principles.

What is claimed is:

1. A device for removing solid pollutants, such as coke dust, from steam and gases evolved during coke quenching operations, in which the evolved steam and gases enter the bottom end of a discharge stack for discharge, from the upper end thereof, into the atmosphere, said device comprising, in combination, at least one pair of vertically oriented support members arranged in opposition along the inner surface of said stack; at least one support beam pivotally connected, at one end, to one of said support members at a selected one of plural points intermediate the bottom and upper ends of said stack; means supporting the opposite end of said at least one support beam at a selected one of plural points along the opposite support member so that said support beam extends transversely of said stack in the path of steam and gases entering said stack for discharge to atmosphere from the upper end of said stack; plural louvered panels mounted on said support beam in a number sufficient to extend across substantially the entire cross-section of said stack in the path of the steam and gases; each of said louvered panels comprising baffle supports and a plurality of shutter baffles stationarily engaged in said baffle supports and extending transversely of said support beam to define tortuous flow paths to deflect the steam and gases, flowing upwardly through said stack during a coke quenching operation, to remove and retain solid pollutants therefrom; and a liquid flushing system supported from said at least one support beam and including conduit means having liquid spray means, at spaced locations along its length, directed toward said shutter baffles; said flushing system being inactive during a coke quenching operation and activated only between successive coke quenching operations to flush solid pollutants from said shutter baffles; said at least one support beam being angularly adjustable about its pivotal connection to vary the angle at which said support beam extends across said stack, and said at least one support beam being adjustable in length and said louvered panels being adjustable in number so that, in each angular orientation of said at least one support beam, the number of said louvered panels is sufficient to extend substantially completely across said stack, whereby said device is effective with different flow rates of the steam and gases; said conduit means including several sections interconnected by flexible conduits so as to conform to such different angular orientations of said support beam; said at least one support beam comprising two telescopically interengaged support beam sections, each section having respective louvered panels mounted thereon and variable in number in accordance with the desired length of said support beam; one of said two telescopically interengaged support beam sections being pivotally connected, at one end, to said one of said support members at a selected one of plural points intermediate the bottom and upper ends of said stack; said opposite support member comprising a vertically oriented and elongated guideway; the other of said two telescopically interengaged support beam sections having a roller rotatably mounted on a shaft at the outer end thereof and engaged in side guideway; and hoist means, including a traction element secured to the outer end of said other of said two telescopically interengaged support beam sections, operable to raise and lower the outer end of said other of said two telescopically interengaged support beam sections with said roller running in said guideway so that the outer end of said other of said two telescopically interengaged support beam sections may be selectively raised and lowered with simultaneous extension and retraction of the overall length of said two telescopically interengaged support beam sections.

* * * * *